US011625232B2

(12) United States Patent
Ravoor et al.

(10) Patent No.: US 11,625,232 B2
(45) Date of Patent: Apr. 11, 2023

(54) SOFTWARE UPGRADE MANAGEMENT FOR HOST DEVICES IN A DATA CENTER

(71) Applicant: EMC IP Holding Company LLC, Hopkinton, MA (US)

(72) Inventors: Shwetha C. Ravoor, Bangalore (IN); Gopinath Marappan, Coimbatore (IN); Sanjib Mallick, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/380,177

(22) Filed: Jul. 20, 2021

(65) Prior Publication Data

US 2022/0391190 A1    Dec. 8, 2022

(30) Foreign Application Priority Data

Jun. 7, 2021 (IN) .............................. 202141025245

(51) Int. Cl.
*G06F 8/65* (2018.01)
(52) U.S. Cl.
CPC ...................................... *G06F 8/65* (2013.01)
(58) Field of Classification Search
CPC ..................................... G06F 8/65; G06F 8/70
See application file for complete search history.

(56) References Cited

U.S. PATENT DOCUMENTS

| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Duy Khuong T Nguyen
(74) *Attorney, Agent, or Firm* — Ryan, Mason & Lewis, LLP

(57) ABSTRACT

An apparatus comprises a processing device configured to receive, from a given host device in a given data center that utilizes a given piece of software, first configuration information associated with the given host device. The processing device is also configured to identify available software upgrades for the given piece of software and to select issue indicators associated with installation of the available software upgrades on other host devices. The processing device is further configured to provide, to the given host device, a recommendation to install the available software upgrades for the given piece of software on the given host device responsive to determining that (i) the first configuration information associated with the given host device has at least a threshold level of similarity to the second configuration information of the other host devices and (ii) the issue indicators have at least a threshold issue criticality level.

20 Claims, 5 Drawing Sheets

(56) References Cited

U.S. PATENT DOCUMENTS

| | | |
|---|---|---|
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0153507 A1* | 6/2011 | Murthy ............... G06F 9/5061 705/348 |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0034023 A1* | 2/2017 | Nickolov ............ H04L 43/0817 |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0174769 A1* | 6/2020 | Zolotow ................ G06F 8/65 |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2021/0357201 A1* | 11/2021 | Blewer ............... G06F 11/1433 |
| 2022/0236973 A1* | 7/2022 | Sethi .................... H04L 41/082 |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |
| WO | PCT/US2019/067144 | 5/2020 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

\* cited by examiner

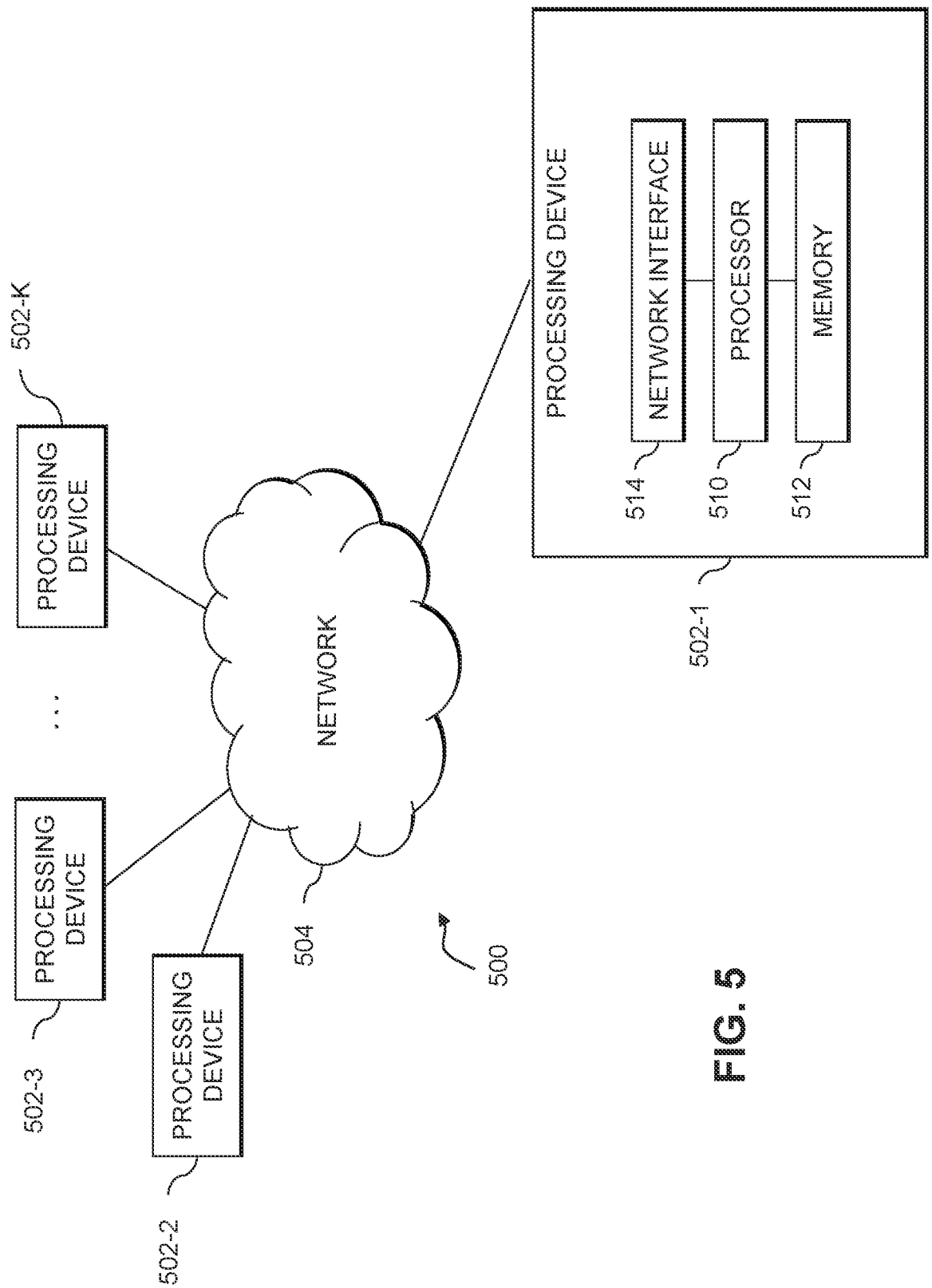

SOFTWARE UPGRADE MANAGEMENT FOR HOST DEVICES IN A DATA CENTER

FIELD

The present invention relates generally to the field of information processing, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments of the present disclosure provide techniques for software upgrade management for host devices in a data center.

In one embodiment, an apparatus comprises at least one processing device comprising a processor coupled to a memory. The at least one processing device is configured to perform the step of receiving, from a given one of a plurality of host devices that utilizes a given piece of software in a given data center, first configuration information associated with the given host device. The at least one processing device is also configured to perform the steps of identifying one or more available software upgrades for the given piece of software, selecting one or more issue indicators from a plurality of issue indicators of an issue database associated with installation of the identified one or more available software upgrades on one or more other ones of the plurality of host devices, and determining whether: (i) the first configuration information associated with the given host device has at least a threshold level of similarity to second configuration information of the one or more other ones of the plurality of host devices; and (ii) the one or more issue indicators have at least a threshold issue criticality level. The at least one processing device is further configured to perform the step of providing, to the given host device, a recommendation to install the identified one or more available software upgrades for the given piece of software on the given host device responsive to determining that (i) the first configuration information associated with the given host device has at least the threshold level of similarity to the second configuration information of the one or more other ones of the plurality of host devices; and (ii) the one or more issue indicators have at least the threshold issue criticality level.

These and other illustrative embodiments include, without limitation, methods, apparatus, networks, systems and processor-readable storage media.

BRIEF DESCRIPTION OF THE DRAWINGS

FIGS. 4 and 5 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
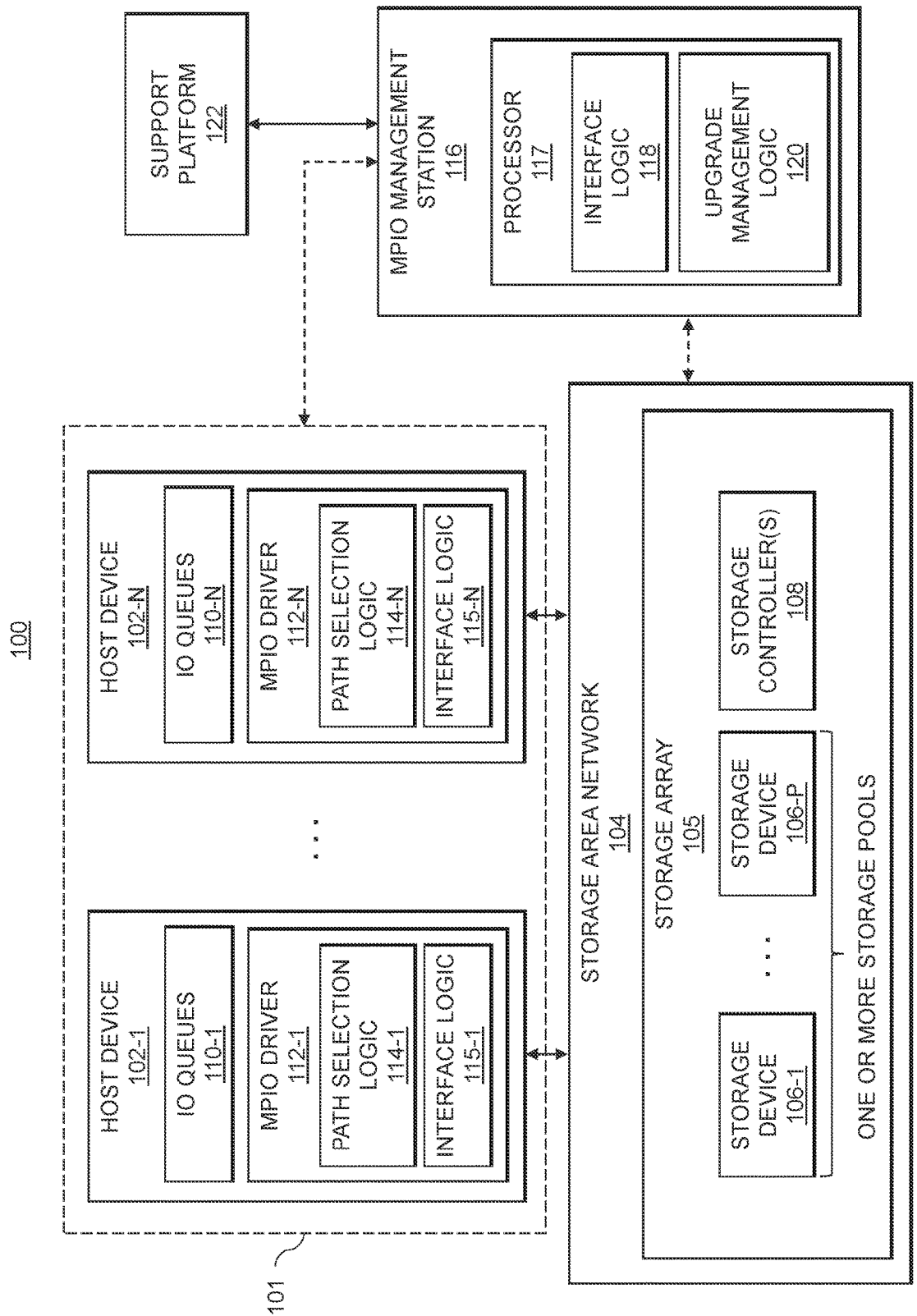
FIG. 1 is a block diagram of an information processing system configured for software upgrade management for host devices in a data center in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N (collectively, host devices 102), where N is an integer greater than or equal to two. The host devices 102 communicate over a storage area network (SAN) 104 with at least one storage array 105. The storage array 105 comprises a plurality of storage devices 106-1, . . . 106-P (collectively, storage devices 106) each storing data utilized by one or more applications running on one or more of the host devices 102, where P is also an integer greater than or equal to two. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, . . . 110-N (collectively, IO queues 110) and respective multi-path input-output (MPIO) drivers 112-1, . . . 112-N (collectively, MPIO drivers 112). The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N (collectively, path selection logic 114) implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, one or more of the MPIO drivers 112 can comprise one or more software programs running on a hardware processor of one or more of the host devices 102.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118 and upgrade management logic 120. The interface logic 118 is utilized to communicate with the host devices 102, the storage array 105 and an external support platform 122. For example, the interface logic 118 may be utilized to communicate with corresponding interface logic 115-1, . . . 115-N (collectively, interface logic 115) implemented by the MPIO drivers 112 of the host devices 102. Such communication illustratively utilizes one or more application programming interfaces (APIs) of the MPIO drivers 112 (e.g., to collect configuration information from the MPIO drivers 112, to push software upgrades to the MPIO drivers 112, etc.). Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate. The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance are illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, the storage array 105 comprises one or more storage controllers 108. The storage controllers 108 may maintain per-port IO processing information. Such per-port IO processing information is illustratively collected by the storage array 105, and in some embodiments may be provided to one or more of the host devices 102 for use in conjunction with path selection.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate logical storage device access as disclosed herein.

It should be noted that various logic components (e.g., path selection logic 114, interface logic 115, interface logic 118, upgrade management logic 120, etc.) disclosed herein can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of IO operations.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing functionality. Such conventional multi-pathing functionality is suitably modified in illustrative embodiments disclosed herein to support upgrade management for at least a portion of software code of the MPIO driver 112.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

Additional examples of processing platforms utilized to implement portions of the system 100 in illustrative embodiments will be described in more detail below in conjunction with FIGS. 4 and 5.

Software upgrade management for various enterprise software is a challenging task. While various embodiments are described herein with respect to the MPIO management station 116 implementing upgrade management logic 120 to manage software upgrades for the MPIO drivers 112 of the host devices 102 (or portions of the software code thereof, such as path selection logic 114), it should be appreciated that embodiments are not limited solely to managing software upgrades for multipathing software. The techniques described herein may more generally be used for managing software upgrades for any type of software product in any domain, including various software that may operate on the host devices 102 outside of the MPIO drivers 112, or various software that operates on host devices which do not include MPIO drivers at all. Thus, the upgrade management logic 120 may more generally be implemented on any type of management appliance or management host that is used to provide control for some other set of host devices in a given data center (e.g., a customer site, an enterprise system, etc.); the upgrade management logic 120 is not limited to being implemented on an MPIO management station.

A conventional approach for managing software upgrades for host resident software (e.g., such as MPIO drivers 112, path selection logic 114 or any other software operating on the host devices 102) includes checking a support matrix to suggest software upgrades whenever such upgrades are available. The support matrix may take into account various host device parameters, including but not limited to operating system (OS) version, kernel and other variables.

As used herein, the term "application or other software upgrade" is intended to be construed broadly. For example, an application or other software upgrade (also referred to as simply a software upgrade or upgrade) may include changing an existing application or other piece of software (e.g., MPIO drivers 112, path selection logic 114, etc.). Changing an existing application or other piece of software may include updating an application or other piece of software to a different version (e.g., which includes updating to a newer version, rolling back to a previous version, etc.). Such updates may involve patching or changing the existing application or other piece of software, or uninstalling the existing application or other piece of software followed by installation of the different version of the existing application or other piece of software. An application or other software upgrade may alternatively include upgrading one or more components or features of an existing application or other piece of software, while leaving other components or features of the existing application or other piece of software unchanged. This illustratively includes installing add-ons or plugins to existing applications or other pieces of software. An application or other software upgrade may alternatively include installation of a new application or other piece of software altogether, rather than upgrading an existing application or other piece of software or component thereof. For simplicity below, an application or other software upgrade may be referred to simply as an "upgrade," "application upgrade" or "software upgrade."

It is not always feasible or desirable for a particular one of the host devices 102 (e.g., host device 102-1) to upgrade to the latest release of some piece of software (e.g., the MPIO driver 112-1, path selection logic 114-1, etc.) due to various operational reasons (e.g., a desire to minimize disruption or downtime). However, if a fix is available for a critical issue involving another one of the host devices 102 (e.g., host device 102-2, or potentially a host device in a different data center, customer site, etc.) with a similar host configuration (e.g., a similar or same product version, OS version, etc.) as the host device 102-1, then it may be highly advisable to upgrade the host device 102-1 to the release with such a fix. Thus, it may be desired to recommend or suggest upgrades only in certain situations (e.g., where there is a possibility of serious issues, as may be determined by considering issues encountered by host devices with similar operating environments). This gives end-users extra context-specific information on why particular host devices 102 should actually upgrade a particular piece of software (e.g., MPIO drivers 112, path selection logic 114, etc.), notwithstanding operational reasons (e.g., a desire to minimize disruption or downtime) which would otherwise cause the end-users to avoid the software upgrade.

Illustrative embodiments provides techniques for overcoming such challenges in deciding which host configurations need or should upgrade a particular piece of software (e.g., MPIO drivers 112, path selection logic 114) and which should not. Such determinations may be made using the upgrade management logic 120 of the MPIO management station 116. As will be described in further detail below, the upgrade management logic 120 may extract relevant details from the host devices 102 (e.g., using interface logic 118) to determine host configurations of the host devices. The upgrade management logic 120 can then compare such host configurations with configuration details extracted from existing customer tickets or other types of issue indicators (e.g., which may be collected from the host devices 102, from other host devices in other data centers or customer sites, combinations thereof, etc.) to make a determination as to whether a particular software upgrade should be suggested or otherwise recommended to a given one of the host devices 102. In other words, the upgrade management logic 120 can determine whether a particular software upgrade is necessary or required for different ones of the host devices 102. Based on this determination, the upgrade management logic 120 may use the interface logic 118 to communicate such suggestions or recommendations to the host devices 102. The upgrade management logic 120 implemented by the MPIO management station 116 can advantageously be used for managing software upgrades for various software on the host devices 102. The software may include software that runs as part of the MPIO drivers 112 (e.g., the path selection logic 114), the MPIO drivers 112 themselves, other software that runs on the host devices 102 outside of the MPIO drivers 112, combinations thereof, etc. As noted above, in some embodiments the upgrade management logic 120 may be used for managing software upgrades for host devices that do not implement MPIO drivers or other types of multipathing software. The upgrade management logic 120 may instead more generally be utilized on any type of management appliance or management host that has some level of control, support or monitoring role for other host devices in a given data center.

In some embodiments, the upgrade management logic 120 may automatically implement installation of particular software upgrades based on the determined recommendations. In other embodiments, the upgrade management logic 120 may generate notifications with the determined recommendations that are caused to be output to the host devices 102 (e.g., in a graphical user interface (GUI) via interface logic 115). Such notifications may include selectable user interface features for end-users of the host devices 102 to accept the recommendations and initiate upgrade of different pieces of software.

The MPIO management station 116, as noted above, implements upgrade management logic 120 that is configured to manage software upgrades for the MPIO drivers 112, path selection logic 114 and potentially other software (e.g., including software running outside of the MPIO drivers 112)

of the host devices 102. The host devices 102 are assumed to comprise production hosts in a data center or other enterprise system, with associated MPIO drivers 112 hosting live functionality (e.g., of path selection logic 114). The host devices 102 are thus also referred to herein as production hosts 102. On such production hosts 102, it may be generally desired to avoid software upgrades for the MPIO drivers 112 or other software of the host devices 102, so as to minimize disruption and downtime.

The upgrade management logic 120 implemented by the MPIO management station 116 may run between a support platform 122 and software (e.g., MPIO drivers 112) in the production hosts 102, to coordinate upgrade of software code used across the production hosts 102. Therefore, the upgrade management logic 120 runs on an external server (e.g., the MPIO management station 116) different than the production hosts 102.

The upgrade management logic 120 utilizes the interface logic 118 to communicate with the production hosts 102 (e.g., via the interface logic 115 of the production hosts 102). The interface logic 118 may also be referred to herein as a management interface 118, with the instances of interface logic 115 of the production hosts 102 being referred to as host interfaces 115. Illustratively, the management interface 118 and the host interfaces 115 comprise Representational State Transfer (REST) or other types of APIs of host-based software running on the MPIO management station 116 and the production hosts 102. The host-based software running on the production hosts 102 may be the MPIO drivers 112. The upgrade management logic 120 utilizes the management interface 118 to communicate with the host interfaces 115 of the production hosts 102 (e.g., to periodically collect configuration information of the host devices 102).

The MPIO management station 116 utilizes the upgrade management logic 120 to determine whether to suggest or recommend software upgrades for respective ones of the host devices 102 (e.g., based on a comparison of the configuration of the host devices 102 and configurations of other host devices that have encountered issues fixed by a particular software upgrade).

The MPIO management station 116 may store various information relating to available software upgrades, host configuration information, customer tickets or other issues encountered on host devices including information regarding whether particular software upgrades provide fixes for such issues, etc., in a local issue database (e.g., local issue database 250 shown in FIG. 2, described in further detail below). Such a local issue database may be implemented internal to the MPIO management station 116, or may be implemented at least partially external to the MPIO management station 116. The local issue database may be any type of database or other data store configured to store such information.

Although not explicitly shown in FIG. 1, one or more input-output devices such as keyboards, displays or other types of input-output devices may be used to support one or more user interfaces to the MPIO management station 116 (e.g., to the management interface 118 thereof, which may provide a graphical user interface (GUI), etc.), as well as to support communication between the MPIO management station 116 and other related systems and devices not explicitly shown.

The production hosts 102, as noted above, implement host interfaces 115. The host interfaces 115 are configured, in some embodiments, to provide configuration information (e.g., which may include system logs or other information associated with issues encountered on the host devices 102) to the upgrade management logic 120 of the MPIO management station 116. The host interfaces are further configured in some embodiments to receive, from the upgrade management logic 120 of the MPIO management station 116, information regarding software upgrades to be applied on the host devices 102 (e.g., within or outside of the MPIO drivers 112).

The upgrade management logic 120 is implemented by the MPIO management station 116, which is assumed to comprise a different physical or virtual computing device than the production hosts 102. The MPIO management station 116 and the upgrade management logic 120 run between the support platform 122 and software (e.g., path selection logic 114) in the MPIO drivers 112 of the production hosts 102, to coordinate software upgrades across the production hosts 102 in the data center or other enterprise system.

The MPIO management station 116 is assumed to provide upgrade management functionality for the production hosts 102 in a particular data center or other enterprise system, such as a particular customer site that the support platform 122 may not be able to directly access. In some embodiments, the MPIO management station 116 (implementing the upgrade management logic 120) and the production hosts 102 (comprising the MPIO drivers 112) are on a "private" network of the data center or other enterprise system (e.g., the customer site that is not accessible by the support platform 122). The private network may be used to secure communications when the MPIO drivers 112 of the production hosts 102 and the upgrade management logic 120 implemented by the MPIO management station 116 initiate connections (e.g., using the management interface 118 and host interfaces 115) to perform various upgrade management tasks for the MPIO drivers 112 of the production hosts 102. It should be appreciated, however, that such a private network connection is not a requirement. In some cases, given the potentially large scale of production hosts 102 with MPIO drivers 112 having software upgrades managed by the upgrade management logic 120 implemented by the MPIO management station 116, the costs of allocating a private network strictly for the purposes of such communication is prohibitive. Thus, an operator of the data center in which the production hosts 102 and MPIO management station 116 operate may desire an alternative for establishing trust between the production hosts 102 and MPIO management station 116 (e.g., between the MPIO drivers 112 and the upgrade management logic 120), such as by leveraging a secure protocol.

In some embodiments, the production hosts 102 and MPIO management station 116 share or utilize dedicated APIs (e.g., REST APIs) for performing software upgrade management tasks performed by the upgrade management logic 120. As noted above, in some embodiments the upgrade management logic 120 is implemented on the MPIO management station 116 that is assumed to reside in the same private network as the production hosts 102 that it manages.

It is to be appreciated that these and other features of illustrative embodiments are presented by way of example only, and should not be construed as limiting in any way. Accordingly, different numbers, types and arrangements of system components such as support platform 122, host devices 102, SAN 104, storage array 105, storage devices 106, sets of IO queues 110, MPIO drivers 112 (including their corresponding instances of path selection logic 114 and interface logic 115), MPIO management station 116, processor 117, interface logic 118 and upgrade management logic 120, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
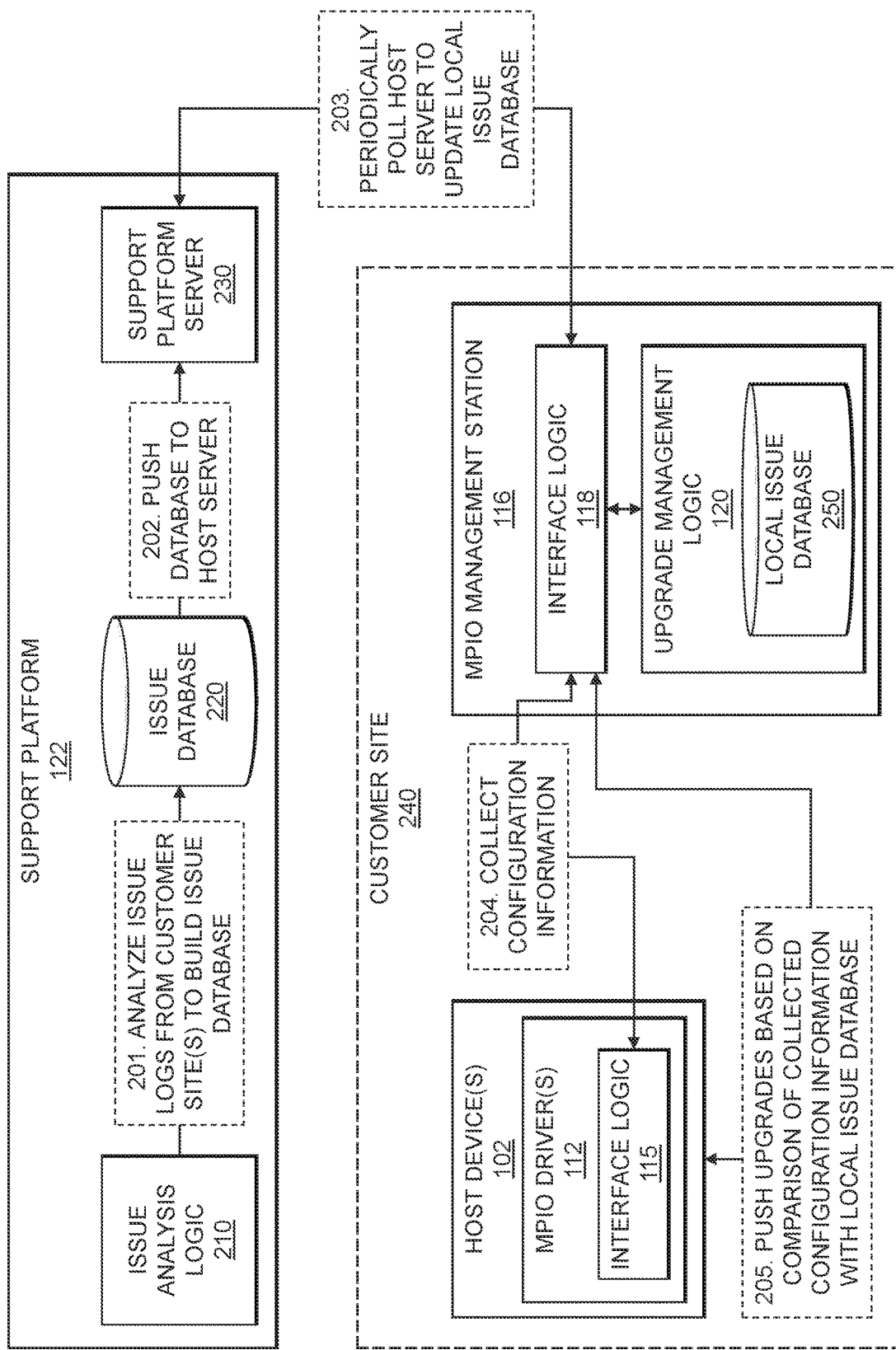
FIG. 2 is a system flow illustrating a process for controlling software upgrades for the host devices in the FIG. 1 information processing system in an illustrative embodiment.

FIG. 2 illustrates a system flow in the information processing system 100 for managing software upgrades for the host devices 102. For clarity of illustration, certain elements of the FIG. 1 system are omitted in FIG. 2. The system flow begins in step 201, where the support platform 122 utilizes issue analysis logic 210 to build an issue database 220. To do so, the issue analysis logic 210 can extract relevant details and parameters from support logs or other issue indicators collected from host devices at one or more customer sites. The customer sites may include customer site 240 that includes the host devices 102 and MPIO management station 116, as well as potentially other customer sites. The details collected for a reported issue may include information such as the product version found and/or fixed, an OS or kernel version, issue criticality, etc. In some cases, some of the information required (e.g., OS or kernel details) may not be available in a proper structured form and thus natural language processing (NLP) or other textual analysis approaches may be utilized to parse unstructured data of the issue indicators to extract the relevant data. Information related to issue criticality may also be mined by applying such NLP or other textual analysis approaches to the unstructured data of the issue indicators. Not all issues are serious or critical, and thus the end-users of some of the host devices 102 may not wish to apply upgrades that fix non-serious or non-critical issues. The issue analysis logic 210 uses such information to build the issue database 220. In some embodiments, the issue analysis logic 210 implements an automatic time-based job scheduler (e.g., a cron or kron job) that analyzes a bug and issue tracker database (e.g., a JIRA database) to build and update the issue database 220.

In step 202, the issue database 220 or at least a portion thereof (e.g., a delta or other summary of changes relative to a previously pushed version of the issue database 220) is pushed to a support platform server 230. The support platform server 230, also referred to as an external host server 230, is assumed to be accessible to the MPIO management station 116 at the customer site 240. The external host server 230, for example, may be available at a uniform resource locator (URL) on a network that is accessible to the MPIO management station 116. In some embodiments, the external host server 230 is part of a monitoring and analytics platform provided by the support platform 122. The monitoring and analytics platform may be cloud-based, such as a Dell EMC CloudIQ platform, which provides proactive monitoring and analytics functionality for storage systems. CloudIQ advantageously provides a Software-as-a-Service (SaaS) solution, enabling delivery of frequent, dynamic and non-disruptive content updates for end-users. Further, CloudIQ is built in a secure multi-tenant platform to ensure that each customer or other end-user tenant is properly isolated and secure from other end-users. Once storage systems establish a connection to CloudIQ, regular data (e.g., alerts, performance information, system logs, issue tickets or other types of issue indicators, etc.) updates may be collected. Such collected data may be used to drive value, such as in leveraging advanced analytics powered by machine learning to deliver higher uptime, increased performance, perform effective capacity planning, triaging service requests, etc. The collected data may be further used as described herein for upgrade management via upgrade management logic 120 on the MPIO management station 116, which as noted above may comprise a PPMA.

The MPIO management station 116 in step 203 utilizes the interface logic 118 to periodically poll the support platform server 230 to update its own version of the issue database 220, shown in FIG. 2 as a local issue database 250 maintained by the upgrade management logic 120. Although shown as internal to the upgrade management logic 120 of the MPIO management station 116 in FIG. 2, the local issue database 250 may be implemented at least in part external to the upgrade management logic 120 and/or the MPIO management station 116 in some embodiments. Step 203 may comprise, for example, the MPIO management station 116 polling the URL of the support platform server 230 to get the issue database 220 or at least a portion thereof (e.g., a delta of changes relative to a previously pushed version of the issue database 220 as described above). Step 203 may be performed periodically on some set schedule (e.g., once a day, once a week, etc.), in response to an end-user request (e.g., support personnel of the customer site 240), in response to a notification received from the support platform 122 (e.g., indicating that there has been some threshold amount of changes or updates to the issue database 220 since the last time the MPIO management station 116 has polled the support platform server 230), etc. The issue database 220 and/or the local issue database 250 may be in the form of one or more extensible markup language (XML) files, JavaScript, etc.

Once the latest database is obtained in step 203, the MPIO management station 116 can utilize interface logic 118 to collect configuration from the host devices 102 at the customer site 240 in step 204. This may involve communication with the interface logic 115. The MPIO management station 116 can thus use the upgrade management logic 120 to perform a configuration analysis to determine which of the host devices 102 should be upgraded. Upgrades can then be pushed to such host devices 102 in step 205. Step 205 may include gathering the relevant details of the host devices, such as product version, OS or kernel version, etc. from the host configuration information obtained in step 204. The upgrade management logic 120 can then compare and see if such details match with any of the issues in the local issue database 250. It should be noted that a match may be found if there is some threshold level of similarity between the configuration information of a given host device and corresponding configuration information of at least a given one of the issues in the local issue database 250. Thus, there does not necessarily need to be an exact match of all of the configuration information in order to find a match between the configuration information of a given host device and one or more of the issues in the local issue database 250.

If a match is found between the configuration information of a given one of the host devices 102 and at least a given one of the issues in the local issue database 250, the upgrade management logic 120 will determine the criticality of the given issue and recommend an upgrade for the given host device 102 if the determined criticality of the given issue exceeds a designated criticality threshold for the given host device 102. The criticality threshold may be set for the customer site 240 as a whole, or may be set individually for each of the host devices 102 at the customer site 240. For example, some of the host devices 102 may wish to upgrade when the determined criticality of the given issue is a first level while other ones of the host device 102 may wish to upgrade when the determined criticality of given issue is a second level different than the first level. The criticality threshold may be set based on various factors, such as the importance of the host devices 102 to operation of the customer site 240, whether particular host devices 102 run as part of an active-active or other redundant configuration (e.g., such that a host device may be taken down while being upgraded without necessarily affecting operation of the customer site 240), etc. It should be noted that step 204 may be performed continuously, or that the MPIO management station 116 may be assumed to already have the desired configuration information for the host devices 102 that is manages in is internal host database. Thus, the upgrade management logic 120 of the MPIO management station can easily compare such information with information in the local issue database 250 to make recommendations on whether to update or upgrade particular software on the host devices 102.

Use of the upgrade management logic 120 provides various advantages. For example, for mission critical infrastructure products (e.g., such as the MPIO driver 112, path selection logic 114, etc.) end-users may be loathe to upgrade such products unless absolutely necessary as any upgrade carries a certain amount of risk. Software products may have built-in mechanisms to check if a newer version is available and, if so, will notify end-users of the availability of an upgrade. The end-users, however, may not be able to discern from such a notification whether a particular host device actually needs to upgrade (e.g., as the new version may not necessarily benefit that host devices' scenario or use case). The upgrade management logic 120 provides improved intelligence for managing upgrades for the host devices 102. For example, the upgrade management logic 120 may only recommend upgrades to particular ones of the host devices 102 where there is a possibility of serious issues (e.g., as determined from issue logs collected for other host devices with similar configurations which have already seen such issues). This gives the end-users of the host devices 102 extra context-specific information to make more intelligent decision as to whether to upgrade software on the host devices 102.

An exemplary process for software upgrade management for host devices in a data center will now be described in more detail with reference to the flow diagram of FIG. 3. It is to be understood that this particular process is only an example, and that additional or alternative processes for software upgrade management for host devices in a data center may be used in other embodiments.

In this embodiment, the process includes steps 300 through 308. The FIG. 3 process is assumed to be performed by a management appliance or management host that has some level of control over, or which provides support and/or monitoring functionality for, at least a subset of a plurality of host devices in a given data center. For example, the FIG. 3 process may be performed by the MPIO management station 116 utilizing the upgrade management logic 120 to manage software upgrades for the MPIO drivers 112 (or portions thereof, such as path selection logic 114), or possibly for software that operates outsides the MPIO drivers 112. As noted above, the MPIO management station 116 may comprise a management appliance (e.g., a PPMA) configured to manage MPIO drivers 112 of the host devices 102 providing respective production hosts for a given piece of software (e.g., the MPIO drivers 112 themselves, features thereof such as path selection logic 114, etc.) in an enterprise system. The FIG. 3 process may alternatively be performed by a management station, appliance or host device that manages software upgrades for any type of host-resident software on a set of host devices, including for host devices that do no implement MPIO drivers or other multipathing software.

Figure 3:
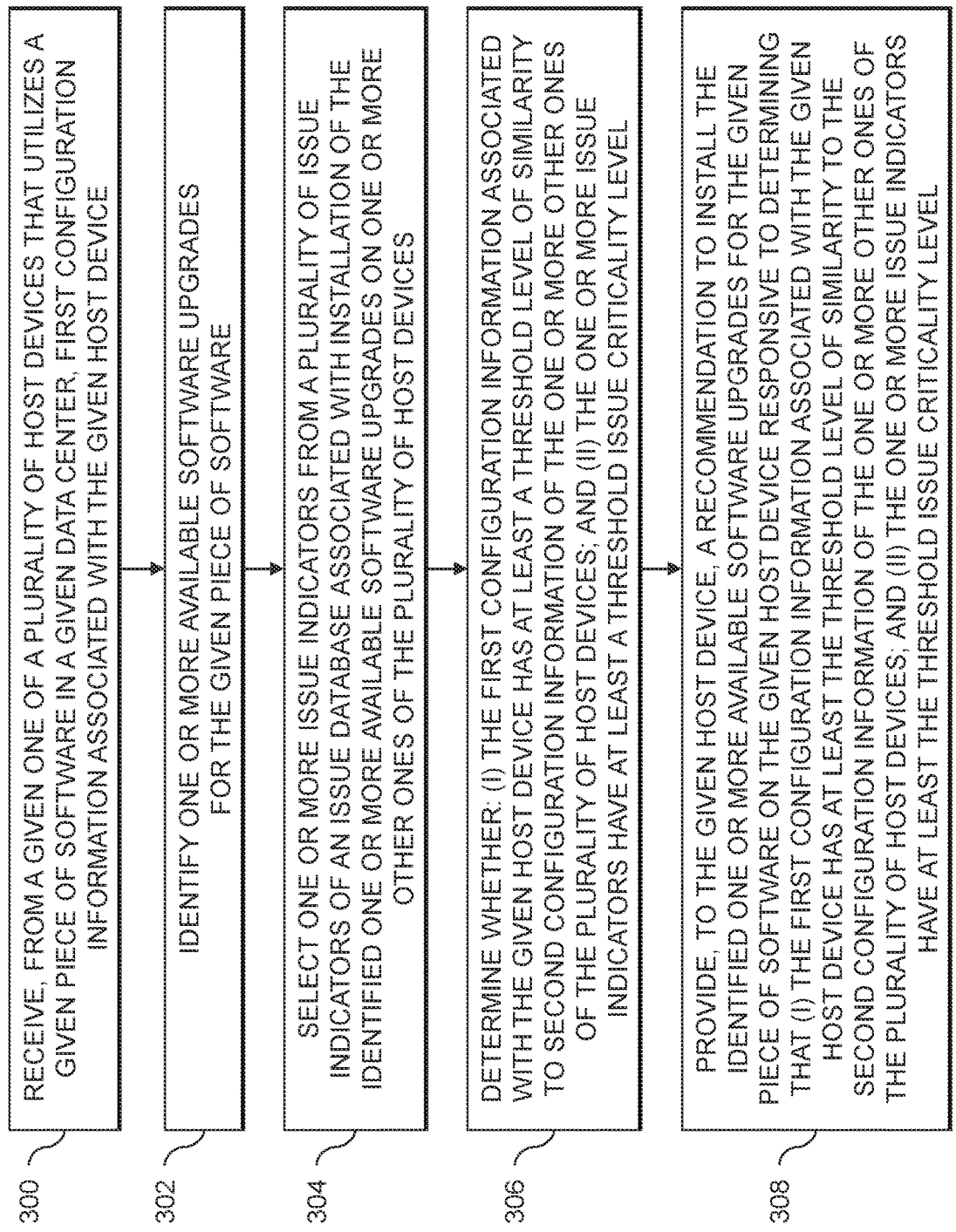
FIG. 3 is a flow diagram of an exemplary process for software upgrade management for host devices in a data center in an illustrative embodiment.

The FIG. 3 process begins with step 300, receiving, from a given one (e.g., host device 102-1) of a plurality of host devices in a given data center that utilizes a given piece of software (e.g., MPIO driver 112-1, path selection logic 114-1, etc.), first configuration information associated with the given host device. The first configuration information may comprise a software product version of the given piece of software currently installed on the given host device, a version of an operating system or kernel of the given host device, etc.

In step 302, one or more available software upgrades for the given piece of software are identified. One or more issue indicators are selected from a plurality of issue indicators of an issue database (e.g., local issue database 250) in step 304. The selected one or more issue indicators are associated with installation of the identified one or more available software upgrades on one or more other ones of the plurality of host devices. The issue database may be obtained from a support platform (e.g., support platform 122) external to the given data center (e.g., customer site 240) that comprises at least a subset (host devices 102) of the plurality of host devices in the given data center (e.g., that are managed by a management appliance, management station or other management host, such as the MPIO management station 116). The issue database may be obtained by polling a URL of a host server (e.g., support platform server 230) of the support platform that is external to the given data center. The management appliance, management station or other management host, such as the MPIO management station 116, may be configured to communicate with the subset of the plurality of host devices over a private network not accessible to the support platform. The support platform may be operated by a software vendor of the given piece of software. The plurality of issue indicators may be associated with host devices operating two or more data centers including the given data center. The one or more other ones of the plurality of host devices may comprise at least one host device external to the given data center.

In step 306, a determination is made as to whether (i) the first configuration information associated with the given host device has at least a threshold level of similarity to second configuration information of the one or more other ones of the plurality of host devices and (ii) the one or more issue indicators have at least a threshold issue criticality level. The threshold issue criticality level may be specified by an end-user of the given host device, or may be specified or set by management appliance, management station or other management host, such as the MPIO management station 116, for all of the host devices 102 that it manages. A recommendation to install the identified one or more available software upgrades for the given piece of software on the given host device is provided to the given host device in step 308 responsive to determining that (i) the first configuration information associated with the given host device has at least the threshold level of similarity to the second configuration information of the one or more other ones of the plurality of host devices; and (ii) the one or more issue indicators have at least the threshold issue criticality level. Step 308 may comprise outputting a notification on the given host device, the notification comprising information associated with a criticality of the one or more available software upgrades and one or more user interface features for initiating installation of the one or more available software upgrades. Step 308 may alternatively or further comprise automating installation of the identified one or more available software upgrades for the given piece of software on the given host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for software upgrade management for host devices in a data center will now be described in greater detail with reference to FIGS. 4 and 5. Although described in the context of system 100, these platforms may also be used to implement at least portions of other information processing systems in other embodiments.

Figure 4:
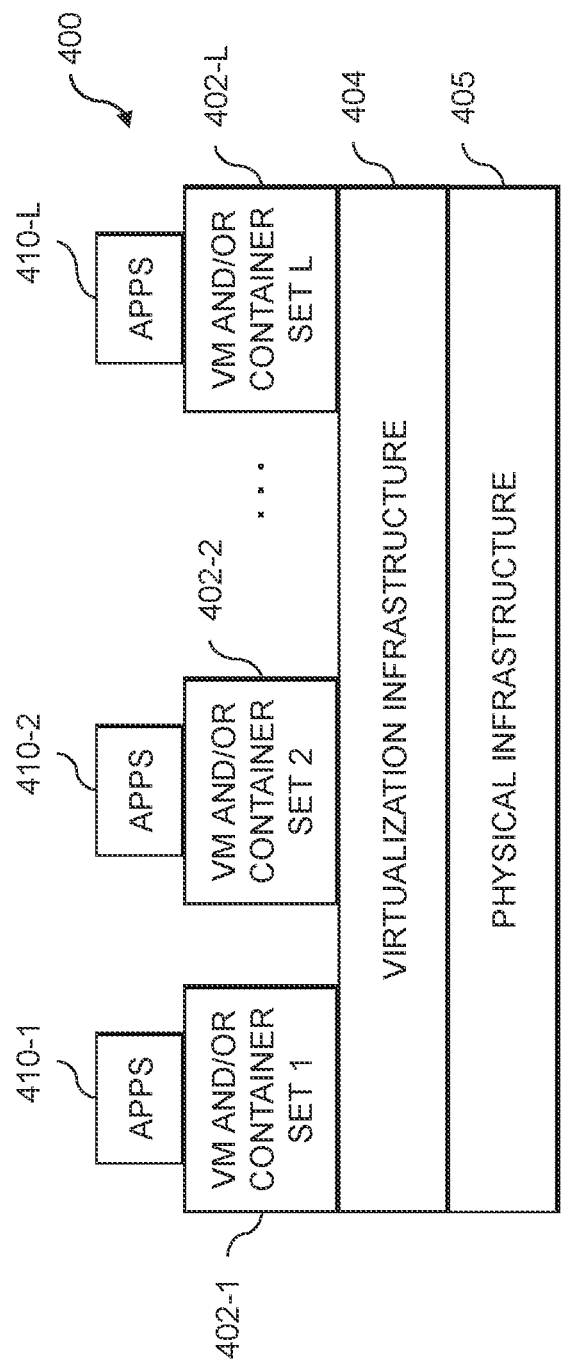

FIG. 4 shows an example processing platform comprising cloud infrastructure 400. The cloud infrastructure 400 comprises a combination of physical and virtual processing resources that may be utilized to implement at least a portion of the information processing system 100 in FIG. 1. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for software upgrade management for host devices in a data center as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, issue analysis techniques, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving, from a given one of a plurality of host devices that utilizes a given piece of software in a given data center via one or more application programming interfaces of a given multi-path input-output driver running on the given host device, first configuration information associated with the given host device, the given piece of software being associated with one or more features of the given multi-path input-output driver, the given multi-path input-output driver being configured to control delivery of input-output operations to a storage system over selected ones of a plurality of paths through a network;
identifying one or more available software upgrades for the given piece of software;
selecting one or more issue indicators from a plurality of issue indicators of an issue database associated with installation of the identified one or more available software upgrades on one or more other ones of the plurality of host devices;
determining whether: (i) the first configuration information associated with the given host device has at least a threshold level of similarity to second configuration information of the one or more other ones of the plurality of host devices; and (ii) the one or more issue indicators have at least a threshold issue criticality level; and
providing, to the given host device, a recommendation to install the identified one or more available software upgrades for the given piece of software on the given host device responsive to determining that (i) the first configuration information associated with the given host device has at least the threshold level of similarity to the second configuration information of the one or more other ones of the plurality of host devices; and (ii) the one or more issue indicators have at least the threshold issue criticality level;
wherein the at least one processing device comprises a management appliance operating in the given data center, the management appliance being configured to manage at least a first subset of the plurality of host devices including the given host device over a private network utilizing the one or more application programming interfaces of the given multi-path input-output driver; and
wherein at least portions of the issue database are obtained from a support platform external to the given data center and not having access to the private network, at least a subset of the plurality of issue indicators of the issue database being associated with at least a second subset of the plurality of host devices that utilize the given piece of software in one or more data centers other than the given data center.

2. The apparatus of claim 1 wherein the first subset of the plurality of host devices provide respective production hosts for the given piece of software in the given data center.

3. The apparatus of claim 1 wherein the threshold issue criticality level is set by the management appliance for the first subset of the plurality of host devices.

4. The apparatus of claim 1 wherein the management appliance is configured to manage multi-path input-output drivers of the first subset of the plurality of host devices.

5. The apparatus of claim 1 wherein the portions of the issue database are obtained by the management appliance polling a uniform resource locator of a host server of the support platform external to the given data center.

6. The apparatus of claim 1 wherein the support platform is operated by a software vendor of the given piece of software.

7. The apparatus of claim 1 wherein the first configuration information comprises at least one of:
a software product version of the given piece of software currently installed on the given host device; and
a version of an operating system or kernel of the given host device.

8. The apparatus of claim 1 wherein the threshold issue criticality level is specified by an end-user of the given host device.

9. The apparatus of claim 1 wherein providing the recommendation to install the identified one or more available software upgrades for the given piece of software on the given host device comprises outputting a notification on the given host device, the notification comprising information associated with a criticality of the one or more available software upgrades and one or more user interface features for initiating installation of the one or more available software upgrades.

10. The apparatus of claim 1 wherein providing the recommendation to install the identified one or more available software upgrades for the given piece of software on the given host device comprises automating installation of the identified one or more available software upgrades for the given piece of software on the given host device.

11. The apparatus of claim 1 wherein the issue database comprises a remote issue database, and wherein the at least one processing device is further configured to perform the step of maintaining a local issue database, the local issue database being periodically updated utilizing information from the remote issue database obtained from the support platform external to the given data center.

12. The apparatus of claim 1 wherein the portions of the issue database obtained from the support platform external to the given data center comprises information regarding whether the identified one or more available software upgrades provide fixes for issues associated with the selected one or more issue indicators.

13. The apparatus of claim 12 wherein providing the recommendation to install the identified one or more available software upgrades for the given piece of software on the given host device is further responsive to determining that the identified one or more available software upgrades provide fixes for the issues associated with the selected one or more issue indicators.

14. A method comprising:
receiving, from a given one of a plurality of host devices that utilizes a given piece of software in a given data center via one or more application programming interfaces of a given multi-path input-output driver running on the given host device, first configuration information associated with the given host device, the given piece of software being associated with one or more features of the given multi-path input-output driver, the given multi-path input-output driver being configured to control delivery of input-output operations to a storage system over selected ones of a plurality of paths through a network;
identifying one or more available software upgrades for the given piece of software;
selecting one or more issue indicators from a plurality of issue indicators of an issue database associated with installation of the identified one or more available software upgrades on one or more other ones of the plurality of host devices;
determining whether: (i) the first configuration information associated with the given host device has at least a threshold level of similarity to second configuration information of the one or more other ones of the plurality of host devices; and (ii) the one or more issue indicators have at least a threshold issue criticality level; and
providing, to the given host device, a recommendation to install the identified one or more available software upgrades for the given piece of software on the given host device responsive to determining that (i) the first configuration information associated with the given host device has at least the threshold level of similarity to the second configuration information of the one or more other ones of the plurality of host devices; and (ii) the one or more issue indicators have at least the threshold issue criticality level;
wherein the method is performed by at least one processing device comprising a processor coupled to a memory;
wherein the at least one processing device comprises a management appliance operating in the given data center, the management appliance being configured to manage at least a first subset of the plurality of host devices including the given host device over a private network utilizing the one or more application programming interfaces of the given multi-path input-output driver; and
wherein at least portions of the issue database are obtained from a support platform external to the given data center and not having access to the private network, at least a subset of the plurality of issue indicators of the issue database being associated with at least a second subset of the plurality of host devices that utilize the given piece of software in one or more data centers other than the given data center.

15. The method of claim 14 wherein the first subset of the plurality of host devices provide respective production hosts for the given piece of software in the given data center.

16. The method of claim 14 wherein the threshold issue criticality level is set by the management appliance for the first subset of the plurality of host devices.

17. A computer program product comprising a non-transitory processor-readable storage medium having stored therein program code of one or more software programs, wherein the program code when executed by at least one processing device causes the at least one processing device to perform steps of:
receiving, from a given one of a plurality of host devices that utilizes a given piece of software in a given data center via one or more application programming interfaces of a given multi-path input-output driver running on the given host device, first configuration information associated with the given host device, the given piece of software being associated with one or more features of the given multi-path input-output driver, the given multi-path input-output driver being configured to control delivery of input-output operations to a storage system over selected ones of a plurality of paths through a network;
identifying one or more available software upgrades for the given piece of software;
selecting one or more issue indicators from a plurality of issue indicators of an issue database associated with installation of the identified one or more available software upgrades on one or more other ones of the plurality of host devices;
determining whether: (i) the first configuration information associated with the given host device has at least a threshold level of similarity to second configuration information of the one or more other ones of the plurality of host devices; and (ii) the one or more issue indicators have at least a threshold issue criticality level; and
providing, to the given host device, a recommendation to install the identified one or more available software upgrades for the given piece of software on the given host device responsive to determining that (i) the first configuration information associated with the given host device has at least the threshold level of similarity to the second configuration information of the one or more other ones of the plurality of host devices; and (ii) the one or more issue indicators have at least the threshold issue criticality level;
wherein the at least one processing device comprises a management appliance operating in the given data center, the management appliance being configured to manage at least a first subset of the plurality of host devices including the given host device over a private network utilizing the one or more application programming interfaces of the given multi-path input-output driver; and
wherein at least portions of the issue database are obtained from a support platform external to the given data center and not having access to the private network, at least a subset of the plurality of issue indicators of the issue database being associated with at least a second subset of the plurality of host devices that utilize the given piece of software in one or more data centers other than the given data center.

18. The computer program product of claim 17 wherein the first subset of the plurality of host devices provide respective production hosts for the given piece of software in the given data center.

19. The computer program product of claim 17 wherein the threshold issue criticality level is set by the management appliance for the first subset of the plurality of host devices.

20. The computer program product of claim 17 wherein the portions of the issue database obtained from the support platform external to the given data center comprises information regarding whether the identified one or more available software upgrades provide fixes for issues associated with the selected one or more issue indicators.

\* \* \* \* \*